United States Patent
Nishibori

(10) Patent No.: US 6,673,207 B1
(45) Date of Patent: Jan. 6, 2004

(54) LAMINATED PHOTOCATALYTIC PULP PAPER AND PROCESS FOR MAKING THEREOF

(75) Inventor: Sadao Nishibori, Tokyo (JP)

(73) Assignee: Ein Kohsan Co., Ltd., Tokyo (JP)

( * ) Notice: Subject to any disclaimer, the term of this patent is extended or adjusted under 35 U.S.C. 154(b) by 0 days.

(21) Appl. No.: 09/718,375

(22) Filed: Nov. 24, 2000

(30) Foreign Application Priority Data

Jun. 16, 2000 (JP) ........................................ 2000-182179

(51) Int. Cl.⁷ ............................................. D21H 17/67
(52) U.S. Cl. ................................. 162/181.4; 162/181.1; 162/168.1; 162/123; 428/328
(58) Field of Search .................... 162/123, 125, 162/132, 146, 168.1, 181.4, 164.1, 290; 442/180, 331; 502/242, 502; 428/328, 329

(56) References Cited

U.S. PATENT DOCUMENTS 6,228,480 B1 * 5/2001 Kimura .................... 428/328
6,239,050 B1 * 5/2001 Lammon-Hilinski et al. .... 442/180

FOREIGN PATENT DOCUMENTS

| EP | 0252204 | | 1/1988 |
| EP | 1079021 | | 2/2001 |
| JP | 05 176953 | * | 12/1991 |
| JP | 05 106197 | * | 4/1993 |
| JP | 99205407 | * | 7/1999 |
| JP | 99117904 | * | 9/1999 |
| JP | 11 323773 | * | 11/1999 |
| JP | 2001 33855 | * | 5/2000 |
| JP | 2001 33856 | * | 5/2000 |
| WO | 87/05346 | | 9/1987 |

OTHER PUBLICATIONS

XP–002204626—Abstract of JP 2000 073297, Mar. 7, 2000 (Nippon Seishi KK).
XP–002204627—Abstract of JP 06 285890, Oct. 11, 1994 (Kobe Steel Ltd.).
XP–002204628—Abstract of JP 10 025696, Jan. 27, 1998 (Gifuken).
XP–002204629—Abstract of JP 08 173805, Jul. 9, 1996 (Mitsubishi Paper Mills Ltd.).
XP–002204630—Abstract of JP 11 323773, Nov. 26, 1999 (Ain Kosan KK).
XP–002204631—Abstract of JP 11 172112, Jun. 29, 1999 (Ain Kosan KK).
Patent Abstracts of Japan JP 11–323773.
U.S. patent application No. 09/389,476.

* cited by examiner

Primary Examiner—Dean T. Nguyen
(74) Attorney, Agent, or Firm—Millen, White, Zelano & Branigan, P.C.

(57) ABSTRACT

An object of the present invention is to provide a laminated photocatalytic pulp paper having a variety of uses such as a filter material, a packaging material, a construction material and the like, which has the antibacterial property, the bad smell degrading property and harmful substance oxidatively degrading property, is useful for use in air treatment, water treatment and soil treatment and, at the same time, can improve the photocatalytic activity effect itself of titanium oxide. According to the present invention, there is provided a laminated photocatalytic pulp paper characterized in that a wastepaper pulp is laminated on a photocatalytic pulp composition in which 40–95 wt % of a pulp and/or a paper having the water content of 3 wt % or less, an average fiber diameter of 5–300 μm and an average fiber length of 0.1–70 mm are blended with 5–60 wt % of titanium oxide, and a paper string comprising this pulp paper.

16 Claims, 5 Drawing Sheets

LAMINATED PHOTOCATALYTIC PULP PAPER AND PROCESS FOR MAKING THEREOF

BACKGROUND OF THE INVENTION

1. Field of the Invention

The present invention relates to a laminated photocatalytic pulp paper, a molding material of which is mainly a pulp and/or a paper and a wastepaper, preferably a wastepaper of newspaper, and which has the photocatalytic activity and a process for producing the same and, more particularly in considering recycling of wastepapers of newspapers, it provides a laminated photocatalytic pulp paper which can be widely applied to various uses as a furniture, a building material and a general packaging material such as a filter material, a paper sliding screen, a paper for a sliding screen, a wall paper, a blind, a panel, a lamp shade, a bed sheet, a curtain, a carpet, a sofa and a sheet, and a flexible composite packaging material, as well as a particular packaging material for, example, antimold use, an interior material for a car, a facing material of an electric product for house use, and a raw material for and an article of various molded articles such as daily necessaries, and a film, a sheet, an adhesive or an adhesive resin layer, various coating agents or a coating resin membrane, or a paint or a paint resin membrane, which has the deodorizing and the antibacterial properties and which can improve or effectively exert the photocatalytic properties of titanium oxide, that is, the properties of titanium oxide of being activated by an ultraviolet ray and oxidatively degrading organic materials, ammonia, NOx, SOx and the like such as the deodorizing and the antibacterial properties, by adsorbing titanium oxide onto a pulp and/or a paper, preferably laminating a wastepaper of newspaper which went through a DIP step, for example, in a paper making step, or laminating wastepapers obtained by separately drying wastepapers of newspapers via an adhesive.

The present invention also relates to the novel use development of the aforementioned laminated photocatalytic pulp paper and provides a paper string comprising the laminated photocatalytic pulp paper as a packaging material as well as other daily necessaries including a mat, a cage, a reed screen, a shop curtain and a cap, and a clothing, which have the deodorizing property and the antibacterial property, or as a water-soluble pet sand which can be flushed down in a washing toilet and has the antibacterial function and the deodorizing function for more effectively treating bad smell produced from feces and urine of a pet, and other various molded articles or materials, and a molded article comprising the paper string.

2. Description of the Prior Art

The above kind of titanium oxide h as been hitherto used as a deodorizing filter or provided as a coating agent, and used in order to obtain the stainproofing or the antibacterial properties of the surfaces by forming a film by coating on an objective material and drying it. In addition, there has been no convention al techniques for a paper string having photocatalytic properties.

However, these previous articles lead to the disadvantageous results that the reacting rate is slow or the completion of the reaction is remarkably late, in the case of articles obtained by coating titanium oxide or inserting and fixing titanium oxide into gaps between fibers.

A main object of the present invention is to provide a laminated photocatalytic pulp paper having the antibacterial, antimold, stainproofing and bad smell degrading, deodorizing and harmful material oxidatively degrading effects, and which is widely used for a packaging material, a building material, a filtering material and the like, and a process and for producing the same.

The present invention also provides a paper string and a molded article as a packaging material suitable for the aforementioned various uses, or as a material for various molded articles, which retain the physical properties as a packaging material such as the tensile strength.

SUMMARY OF THE INVENTION

In order to attain the aforementioned objects, a laminated photocatalytic pulp paper of the present invention is characterized in that a virgin pulp or a wastepaper pulp is laminated on a photocatalytic pulp composition as a blend in which 40–95 wt % of a pulp and/or a paper having the water content of 3 wt % or less, an average fiber diameter of 5–300 µm and an average fiber length of 0.1–70 mm are blended with 5–60 wt % of titanium oxide.

In addition, a thermoplastic resin can be blended with the titanium oxide, the pulp and/or the paper at an amount of 25–100 wt % relative to a total weight of the titanium oxide, the pulp and/or the paper, and a virgin pulp or a wastepaper pulp can be laminated on the blend.

A process for producing the laminated photocatalytic pulp paper comprises a step of imparting the stirring impact force to a blend obtained by blending 40–95 wt % of a pulp and/or a paper which has been split and disaggregated to an average fiber diameter of 5–300 µm and an average fiber length of 0.1–70 mm with 5–60 wt % of titanium oxide to stir and, whereby, the shear exothermic heat is generated by a shearing force based on the stirring impact force and the blend is dried by this shear exothermic heat to reduce the water content to 3 wt % or less, a step of swelling the pulp and/or the paper upon the drying to obtain a three-dimensionally entangled material, a treatment step of pushing the titanium oxide against the fiber surface of the pulp and/or the paper by the stirring impact force to fix thereto, and a step of laminating a virgin pulp or a wastepaper pulp in a paper making step after the treatment step of pushing and fixing the titanium oxide.

In addition, in the above process, a thermoplastic resin can be blended with the titanium oxide, the pulp and/or the paper at an amount of 25–100 wt % relative to a total weight of the titanium oxide, the pulp and/or the paper.

When the wastepaper pulp comprises a newspaper wastepaper via a DIP step, it is suitable for reusing a newspaper wastepaper and lamination can be performed using this wastepaper pulp as a core material or a substrate.

Furthermore, a synthetic fiber having the average fiber length of 1 to 100 mm, the average diameter of 10 to 40 µm and a melting point of 120° C. or higher can be blended into 5 to 60 wt % of titanium oxide and 40 to 95 wt % of a pulp and/or a paper at a maximum ratio of 1:9.

In the case where the raw pulp as a photocatalytic pulp composition is a paperboard-like dry pulp, the process includes a splitting or disaggregating step 303 by which the above dry pulp is treated, that is, the dry pulp is cut into a plurality of sections to be treated, and the impact grinding force is applied to the formed individual sections to obtain pulp fibers which are ground and aggregated into cotton-like fibrous pulp fibers, have approximately the same length of a fiber like raw pulp and have no fiber hair even with the grinding.

In addition, an apparatus for splitting or disaggregating the dry pulp is for treating a plate-like dry pulp, and is provided with a fixed side impact grinding means in which a port 132 for supplying a plurality of chopped small sections to be treated is past in the center of a fixed disc 131 and respective fixing pins 134 are successively provided on a plurality of rotating loci, a mobile side impact grinding means in which a mobile disc 141 is rotatably and drivably provided opposite to the fixed circular disc 131 and a plurality of mobile pins 144 different from the respective fixing pins 134 are successively provided on a plurality of rotating loci on the mobile disc 141, and preferably a recovery means for discharging contaminants which is opened in a discharge outlet via a screen 151 positioned on a combinatorial circumference of the respective fixing pins 134 and the respective mobile pins 144 and provided with small pores having the predetermined diameter, and further a take-out means for taking out small sections to be treated which remain in the screen 151 and which have been ground and aggregated into cotton-like fibrous pulp fibers 84, through an outlet.

The thus recovered pulp fibers 84 are transferred to a next step, that is, a step of fixation-treating titanium oxide.

Furthermore, a paper string comprising the laminated photocatalytic pulp paper of the present invention is characterized in that the laminated photocatalytic pulp paper which have been cut into an arbitrary width of 5–50 mm are twisted at a basis weight of preferably about 20–80 g/m². This can be cut into a diameter of about 2–5 mm and a length of about 5–30 mm and can be used as a water-soluble pet sand which has the antibacterial property and the deodorizing property for more effectively treating bad smell produced from pet feces and urine as treatment of pet feces and urine, in addition to the utility as a packaging material and the like.

The process for production comprises cutting the laminated photocatalytic pulp paper into a width of 5–50 mm, which is wound in a roll-manner and, thereafter, twisted for example at around 15–30 turns.

In addition, a step of stacking a plurality of, for example, 10–40 of the paper strings on the same plane and immersing it in a water-soluble adhesive to dry can be repeated about three times and the adhesive can be removed by sanding to obtain a molded belt-like flat string.

In addition, a woven fabric can be manufactured using the paper string as a weft and a thread comprising a natural fiber such as a cotton yarn or a chemical fiber such as rayon as a warp and, further, the paper string, the flat string and the woven fabric may be combined to use for a variety of utilities.

BRIEF DESCRIPTION OF DRAWINGS

The objects and advantages of the invention will become apparent from the following detailed description of preferred embodiments thereof provided in connection with the accompanying drawings throughout which like numerals denote like elements and in which.

DETAILED DESCRIPTION OF THE PREFERRED EMBODIMENT

EXAMPLE (1) MATERIAL TO BE LAMINATED FOR A PHOTOCATALYTIC PLUP COMPOSITION

Figure 1A:
FIG. 1 is a view showing the surface of the photocatalytic pulp composition of an embodiment of the present invention measured by a scanning microscope. (A) magnification×200 and (B) magnification×750.

In this Example, a pulp and/or a paper used as a raw material includes not only a so called virgin pulp in a paper making step but also a wastepaper pulp or a pulp obtained by mixing the both at 1:1, and the paper includes a normal paper and widely a wastepaper such as wastepaper of newspaper.

A wastepaper which is ground with a cutter mill having 10 mm×10 mm screen and, thereafter, treated and which contains a large amount of a printing ink is preferably bleached or colored with a DIP treatment in a paper making step like a wastepaper to be laminated as described below.

And the average fiber diameter is 5 to 300 μm and the average fiber length is 0.1 to 70 mm, and the bulk specific gravity is 0.005 to 0.04 in the case of the paper fiber and 0.24 in the case of the virgin pulp and/or paper. 80 wt % of it (upon this, the pulp and/or paper contains about 8 wt % of water) and 20 wt % of titanium oxide are incorporated.

The average fiber diameter of the pulp and/or the paper of 5 to 300 μm, and the average fiber length of 0.1 to 70 mm means a particle size of 50% by weight in accumulative weight percent of the pulp and/or the paper.

In the case of a paper, a paper is grinding treated with a crusher and past through a screen having 10 mm mesh, which is used.

In addition, a printing ink in a wastepaper has no problem upon treatment except that a product is slightly colored.

In the case of paperboard like dry pulp, the dry pulp is cut into a plurality of sections, and the impact grinding force is applied to the formed individual sections to obtain pulp fibers which are ground and aggregated into cotton-like fibrous pulp fibers, have approximately the same length of that of a fibrous raw pulp and have no fiber hair even with the grinding. Such the paperboard like dry pulp after the splitting and disaggregating step 303 is used.

An impact grinding means used in this step is referred to as "separator" for convenience in this Example.

In FIGS. 3 to 6, a separator 130 is past and opened in a port 132 for supplying respective small sections to be treated in the center of a fixed circular disc 131, a fixed end plate 133 is opposite to the fixed circular disc 131 separating by a treating space 155, respective circumferential edges of the fixed end plate 133 are fixed to the fixed circular disc 131 with a circumferential side plate 135. A mobile circular disc 141 which is rotated and driven by a rotating transverse axis 142 in the interior of the treating space 155, the rotating transverse axis is supported pivotally by each bearing 143, 143. The rotating transverse axis 142 is rotated and driven by a rotating driving means such as a motor and the like. And, on the fixed circular disc 131, a plurality (6 in this Example)

of respective pins 134 are provided on rotating loci a1 to a6 (relative to a mobile plate 141) (FIG. 5) on a concentric circle, and 16 24 32 36 40 42 of respective fixing pins 134 are successively provided from the center of the fixed circular disc 131 on a concentric circle towards the circumferential edge in this Example. On the other hand, on the mobile circular disc 141, a plurality (6 in this Example) of mobile pins 144 which are different from the respective fixing pins 134 and positioned alternately on rotating loci b1 to b6 are successively (4 4 4 4 4 6) provided on the concentric circle from the center of the mobile circular disc 141 towards the circumferential edge, and which are positioned so that the splitting and disaggregating action is obtained between respective fixed and mobile pins 134, 144 by the impact grinding force.

Further, a screen 151 having the predetermined mesh in which small pores having the desired diameter are formed by punching is circumferentially provided on the circumferential side of a mobile circular disc 141 between the circumferential side plate 135 separating by a discharge port 156, and a discharge port 152 is provided below a discharge space 156. A blower 157 is communicated with the discharge port 152 in a separator 130 as shown in FIG. 6.

And, a discharge port 152 is communicated with a recovery tank 250 via a discharge tube 239 provided with a blower 157.

Figure 3:
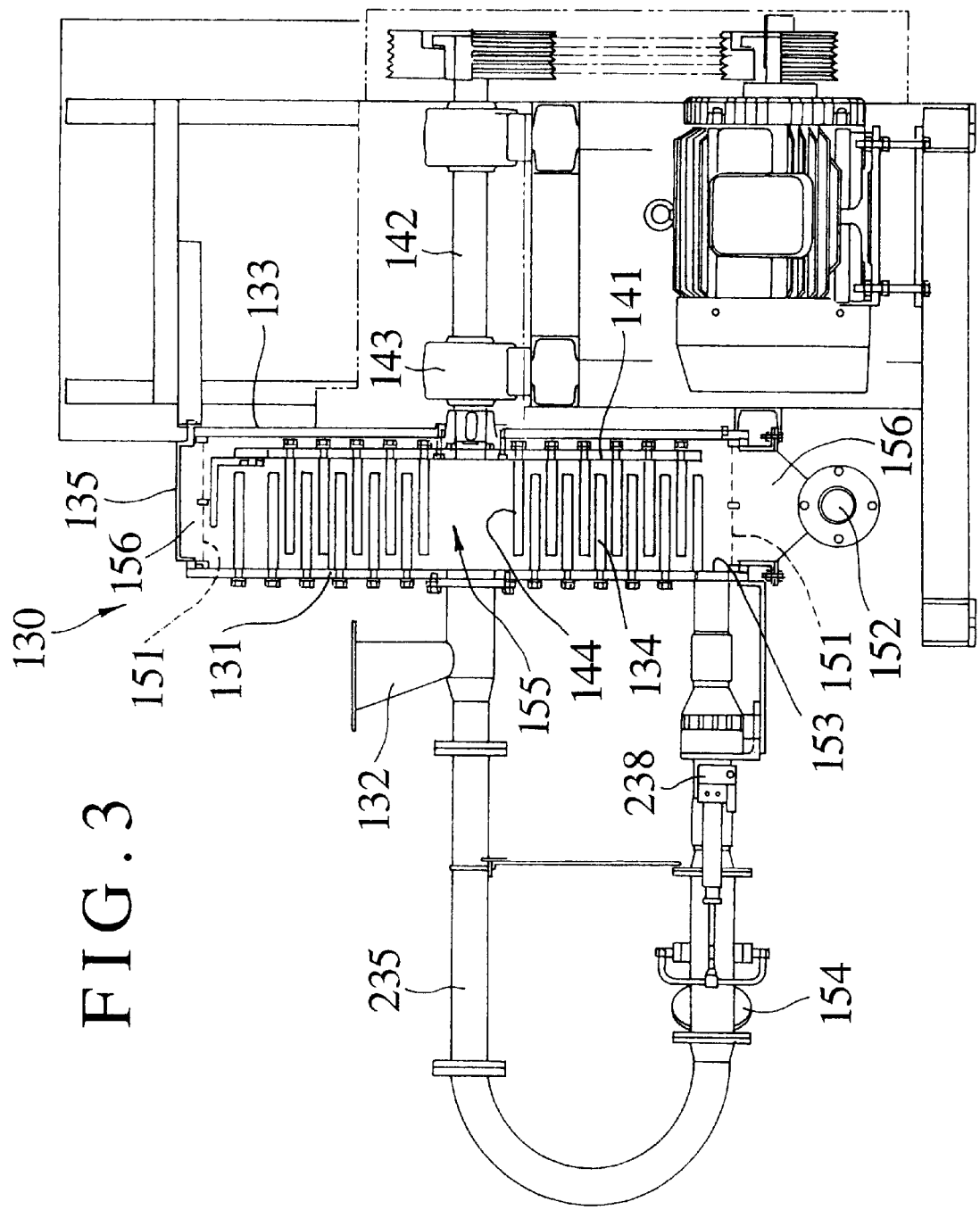
FIG. 3 is a partial cross sectional view schematically showing the outlined construction of an impact grinding apparatus used in a step for splitting and disaggregating the present paperboard like dry pulp.
Figure 4:
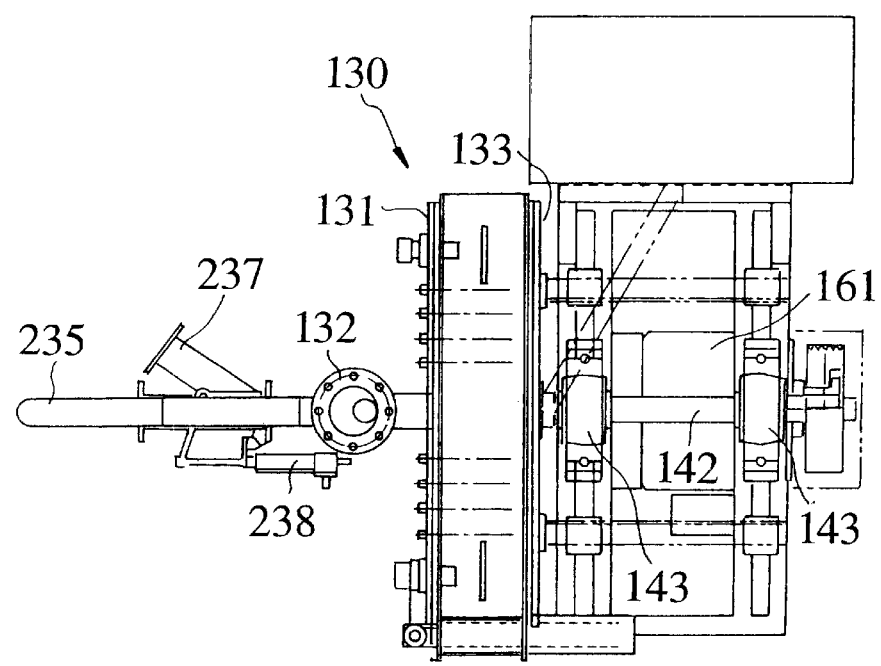
FIG. 4 is a plane view of FIG. 3.
Figure 5:
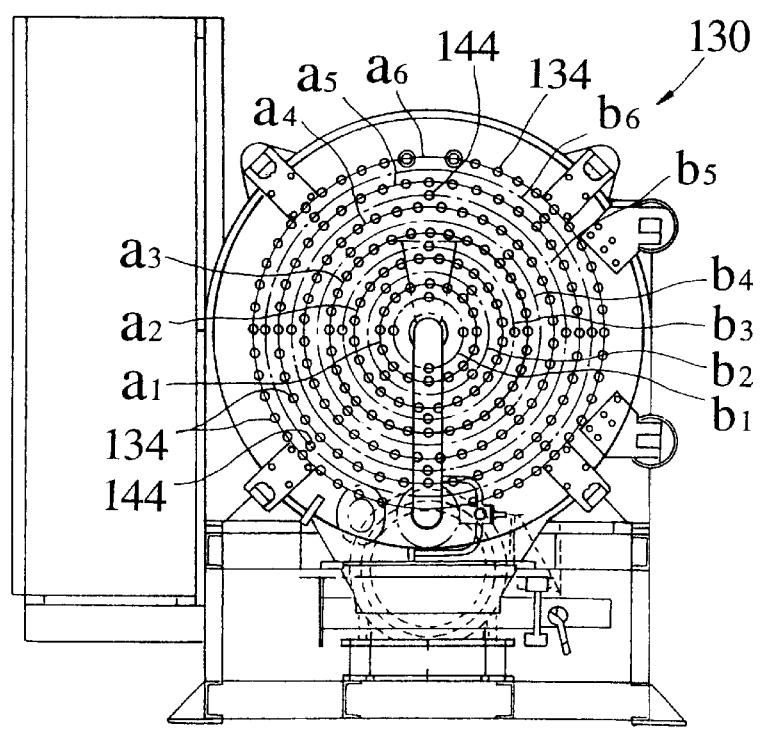
FIG. 5 is a schematical front view for explaining the impact grinding action in the splitting and disaggregating step of FIG. 3; and, FIG. 6 is an outlined view showing an use example of the impact grinding means used in the splitting and disaggregating step of the present invention.

In addition, as the screen 151, a screen having the diameter of about 0.8 mm to 2.0 mm, though depending upon the rotation number of a mobile pin described below is used. Further, a take out port 153 is formed on an lower part in the interior of a screen 151 of a treating space 155 (FIG. 3). The grinding force which is applied to small sections to be treated is weakened by increasing the clearance between the respective fixed and mobile pins 134, 144 and the grinding force is strengthened by decreasing the clearance. A blower 157 which sucks air in a separator 130 is communicated with the take out port 153 as shown in FIG. 6, and may be communicated with a supply port 132 via this blower 157.

Figure 6:
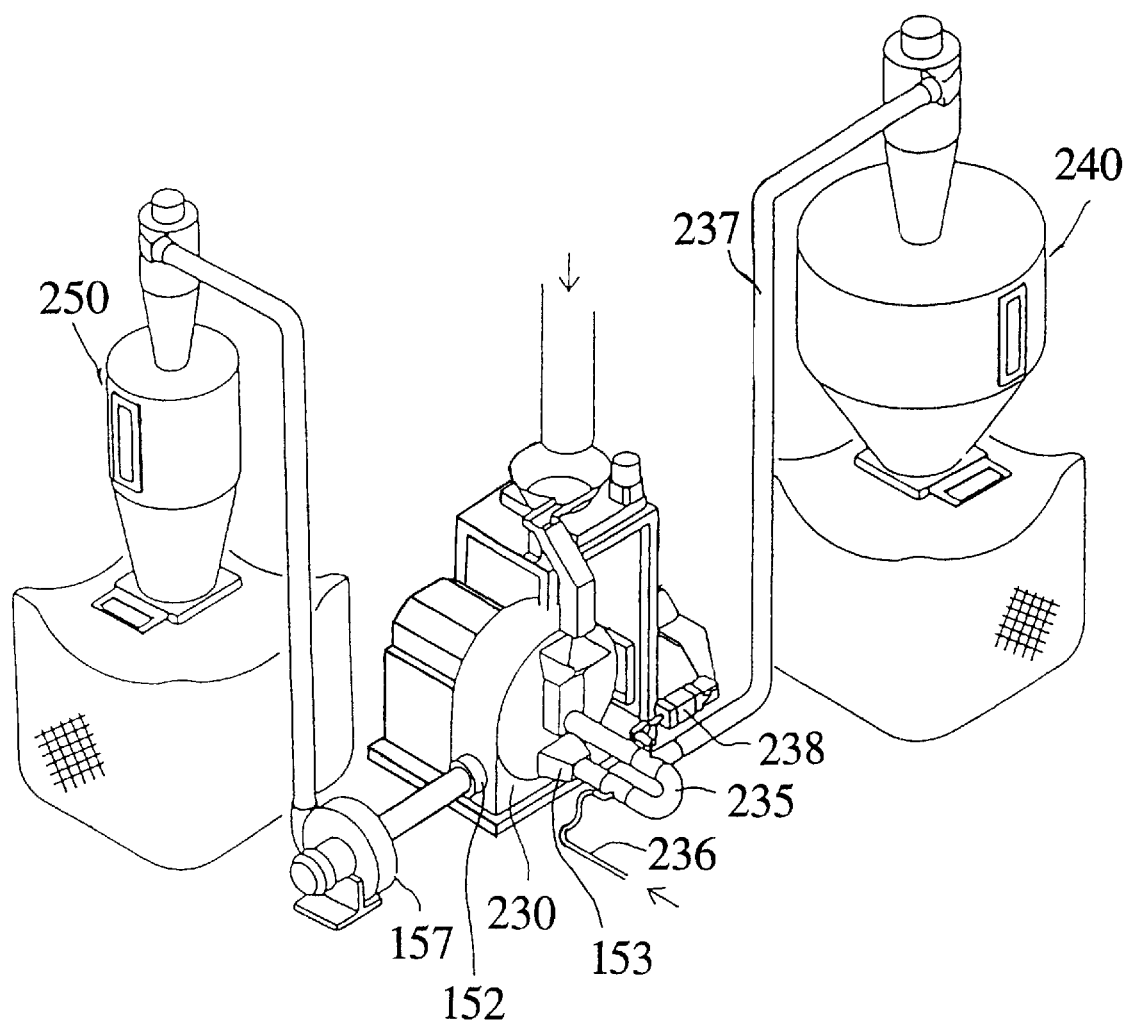

In addition, as shown in FIGS. 3 and 6, the following construction may be taken: A take out port 153 and a treating space 155 are communicated via a communicating tube 235, the compressed air which is circulated in a treating space 155 from a take out port 153 and which is from a compressed air supplying source (not shown) is introduced in a communicating tube 235 via a piping 236, and ground pulp fibers and alien substances which are discharged from a take out port 153 are circulated again in a treating space 155 in a separator 130.

Alternatively, a ramificating tube 237 communicating with a tank 240 for recovering the pulp fibers, or the pulp fibers and alien substances is provided by branching a supply port side of the communication tube 235, a two directional valve 238 which can be appropriately switched every set time, for example, with a timer circuit is provided at a ramificating point of this ramificating tube 237, the downstream side of the communicating tube 235 is closed with a magnetic valve and the ramificating tube 237 side is opened, the pulp fibers which remain in a screen 151 are sucked and recovered in a recovery tank 240 via a ramificating tube 237. Alternatively, a magnetic valve which opens and closes the ramificating tube 237 and a magnetic valve which opens and closes the downstream side of the ramificating tube 235 are provided, and these two magnetic valves may be opened and closed alternately (FIG. 6).

By rotating a rotating transverse axis 142 with a rotating driving means such as a motor or the like to rotate a mobile circular disc 141 and supplying respective small sections to be treated in a supply port 132, the respective small sections to be treated are loosened into smaller fibers between respective fixed and mobile pins 134, 144 by the impact grinding force in the center of the treating space 155 and, on the other hand, the diameter of the alien substances becomes about 2 to 6 mm in an indefinite manner by the impact grinding force. That is, respective small sections to be treated are beaten and ground or pulverized into small pieces with the impact by respective fixed and mobile pins 133 and 144, and since the bending action is repeatedly applied to the respective small sections to be treated, the finely divided paperboard is separated from small sections to be treated. Like this, the pulp fibers and alien substances which constitute the small sections to be treated are separated every its kind, respectively, the boardpaper is loosened into fibers and the alien substances are ground into fine pieces, respectively.

During this period, by an air stream produced by the compressed air which is supplied in a treating space 155 by the centrifugal force by rotation of a mobile circular disc 141 or the suction force of a blower 157 or via a piping 236, the separated and fiberized paper layer and pulp fibers or fiberized paper layer and a small amount of alien substances gradually approach the circumferential side of a circumferentially provided separator 130 of a screen 151 in the mixed state. Thereafter, the fiberized pulp is past through a screen 151 which is formed into meshes having the diameter of about 0.8 to 2 mm and discharged into a discharge space 156 and, thereafter, sucked towards the outside via a discharge port 152 and a blower 157, and recovered in a recovery tank 250 via a discharge tube 239. On the other hand, the thin substance pieces and a small amount of pulp fibers which are aggregated into a cotton-like fibrous pulp fibers can not pass a screen 151 and remain in the treating space. When the recovery of the pulp fibers is completed, the alien substances which remain in the interior of a treating space 155 are discharged outwards from a take out port 153.

The discharged substances are recovered into a recovery tank 240 via a ramificating tube 237 by closing the downstream side of the communicating tube 235 and opening the ramificating tube 237 side with a two directional magnetic valve 238 of a ramificating tube 237 which is branched on the supply port side of the communicating tube 23 and which is communicated with a tank 240 for recovering the pulp fibers to suck the alien substances which remain in a screen 151.

In FIG. 3, the connection of a communication tube 235 to a ramificating tube 237 is carried out via a flange 154 provided on a piping in which the upstream side and the take out 153 side of a communication tube 235 are branched (towards a rear of a paper plane in FIG. 3).

The pulp fibers thus recovered are transferred to a next step.

Titanium oxide is effective when its particle size is smaller and, for example, the X ray diameter of 7 to 50 nm can be used.

The pulp and/or the paper and titanium oxide, or these materials together with synthetic fibers are placed, and the water content of titanium oxide and the pulp and/or the paper is adjusted to 3 wt %, preferably to 1 wt % or less by producing the shearing heat release by the shearing force based on the stirring impact force by a stirring impact blade rotating at a high speed in a mixer to raise a temperature to about 120° C. In this step, water is evaporated from the pulp and/or the paper to dry it and at the same time the pulp and/or the paper in the case of a paper undergo the grinding action by the impact force, is swelled at the same time with the drying, the fibers become hairy and aggregated into cotton-like fibrous pulp fibers to obtain three dimensionally entangled fibers. Thereafter, titanium oxide is attached to or inserted in to fix the fiber surface and the interior of the fibers by the stirring impact force by the stirring impact blade or the external pressing force accompanied with the shearing force.

The synthetic fiber is preferable when the average fiber length is 1 to 100 mm, the average diameter is 10 to 40 μm, and a melting point is 120° C. or higher.

A virgin pulp has usually the water content of around 10 wt % in the case of a plate-like dry pulp but, also in the case of the higher water content, a virgin pulp is to be pre-dried or is preferably pre-dried to the water content of 10 wt % or less with the mixer or the known drier before mixing of titanium oxide.

In this step, the attachment and fixation of titanium oxide are completed to form "photocatalytic pulp composition".

In this step, the pulp and/or the paper in the raw material dose not become a large lump, are aggregated while cotton-like fibrous pulp fibers without the mutual firm entanglement of the individual fibers and, in this sense, the three dimensionally entangled fibers are formed and the individual pulp and/or paper are formed in such the form that titanium oxide is attached to all the surface of the fiber of the pulp and/or the paper. Since these individual are aggregated into cotton-like fibrous pulp fibers from a paper, there is no adhesive properties between the simple pulp and/or the paper and the lump itself has the high bulk sepcific gravity. Therefore, the photocatalytic pulp composition formed by this step is a better material as a photocatalytic pulp composition which can be made into a paper in various known paper making steps.

The above step is described in more detail. Since the water content of the pulp and/or the paper is 3 wt % or less, the interface between titanium oxide and the pulp and/or the paper is lost, titanium oxide is dispersed into the pulp and/or the paper at a uniform density, titanium oxide becomes easy to be absorbed onto or attach to the pulp and/or the paper and at the same time the pulp and/or the paper is mixed and dispersed while completely surrounding the circumference of the pulp and/or the paper.

As such, the present photocatalytic pulp composition can be used as a raw material to form a paper by various paper making methods.

In addition, a plastic fiber or glue, starch, wax or a resin adhesive such as vinyl acetate and acryl system can be mixed therein in a paper making step to prepare a molded photocatalytic pulp composition.

A photocatalytic pulp paper was prepared using the above pulp composition having the photocatalytic activity.

As Examples and Comparative Examples of a photocatalytic pulp composition using a photocatalytic pulp composition, titanium oxide ST 01 (manufactured by Ishiharatechno Company) having the X ray diameter of 7 nm, the titanium oxide content of 90 wt % or more and the specific area of 300 m$^2$/g was used to treat with the stirring impact force by a stirring impact blade rotating at a high speed in the mixer (120° C.).

PHOTOCATALYTIC PULP COMPOSITION: EXAMPLE 1

About 2.5 kg of a plate-like dry pulp is treated in the splitting and disaggregating step to obtain about 2.0 kg of aggregated cotton-like fibrous pulp (the water content; 0.5 wt %)

PHOTOCATALYTIC PULP COMPOSITION 2; EXAMPLE 2 (FIG. 1 AND FIG. 2)

Crushed Paper fiber 2 kg (80 wt %), the water content 10 wt %; Treated in the splitting and disaggregating step.

Titanium oxide; 0.5 kg (20 wt %)

This was treated via a fixation treating step to obtain about 2.3 kg of a photocatalytic pulp composition (The water content after treatment; 0.6 wt %).

PHOTOCATALYTIC COMPOSITION PAPER: EXAMPLE 1

Using the photocatalytic pulp composition obtained in the above [Photocatalytic pulp composition 1: Example 1], the composition was diluted to the pulp concentration of 8 wt % to perform the beating treatment with a beater for 1 hour.

On the other hand, a beaten pulp raw material such as a virgin pulp including a Japanese paper, herein for example, a wastepaper pulp comprising a wastepaper of newspaper after a DIP step (de-inking treatment) was diluted with water to the pulp concentration of 8 wt %, beat treated for 1 hours, then a wet sheet of a pulp comprising a photocatalytic pulp and a wastepaper of newspaper is made into a paper using a paper making machine in the known paper making step. A photocatalytic pulp (50 g/m$^2$) and a pulp comprising a wastepaper of newspaper (10 g/m$^2$) after beating treatment were made into a paper using a wire paper machine and a cylinder paper machine, respectively, which were overlapped, transferred to a press part and further dried to make a paper.

By the foregoing, a transparent, air-permeable white substrate layer was laminated on a photocatalytic pulp layer (Example 1).

PHOTOCATALYTIC PULP COMPOSITION PAPER: EXAMPLE 2

The photocatalytic pulp composition obtained in [Photocatalytic pulp composition 2: Example 2] and a wastepaper of newspaper were made into a paper as in Example 1.

Beater treatment time 1 hour
Concentration of photocatalytic pulp 8 wt %
Concentration of a wastepaper of newspaper pulp 8 wt %
Basis weight Total 60 g/m$^2$
Photocatalytic pulp layer 50 g/m$^2$
Newspaper wastepaper pulp layer 10 g/m$^2$

PHOTOCATALYTIC PULP+PAPER; COMPARATIVE EXAMPLE 1

Paper fibers; 2 kg (80 wt %) and titanium oxide; 0.5 kg (20 wt %) were diluted to the pulp concentration of 8 wt % with a beater without using a mixer in the above embodiment and Example, to make a paper. Basis weight Total 50 g/m$^2$ The test results of the above Examples 1 and 2 and Comparative Example 1 are shown below.
Test Conditions
Concentration of added acetaldehyde about 820 ppm
Light intensity about 1 mW/cm$^2$
Reaction vessel 1 liter

PHOTOCATALYTIC PULP PAPER AND OTHER COMPARATIVE EXAMPLE

Sample size 8×8 cm Basis weight: Examples 1, 2 Total 60 g/m

Comparative Example 1 50 g/m²

TABLE 1

| | Photocatalyst Co₂ initial producing at 1 h ppm/min | Co₂ production rate at 2 h (%) | Co₂ production rate speed (%) | Acetaldehyde initial vanishing speed (ppm/min) |
| --- | --- | --- | --- | --- |
| Test Ex. 1 | 29.8 | 79 | 100 | 18.9 |
| Test Ex. 2 | 24.0 | 68 | 100 | 17.5 |
| Comp. Ex. 1 | 11.0 | 38 | 47 | 7.4 |

The photocatalytic $Co_2$ initial producing rate is obtained by the following formula;

(Apparent Co₂ initial producing rate)–(light control Co₂ producing rate)

Acetaldehyde initial vanishing rate is the vanishing rate at 30 min. after photo-irradiating.

The production rate (%) at 1 h or 2 h is a ratio of the production relative to theoretical value and was calculated by only photocatalyst portion.

The initial acetaldehyde vanishing rate (%) is concentration at 1 h/initial concentration×100.

The photocatalyst+pulp paper; a paper of Comparative Example 1 has the extremely low photocatalytic activity and the acetaldehyde vanishing rate is slow.

To the contrary, the photocatalytic pulp composition Test Example 1 shows 100% of $Co_2$ production rate at 2 h like Test Example 2, and it can be seen that after the concentration of acetaldehyde is decreased, the sufficient reaction occurs.

It was seen that simple mixing of titanium oxide can not afford the effects and the present invention extremely can improve the photocatalytic activity.

Figure 1B:
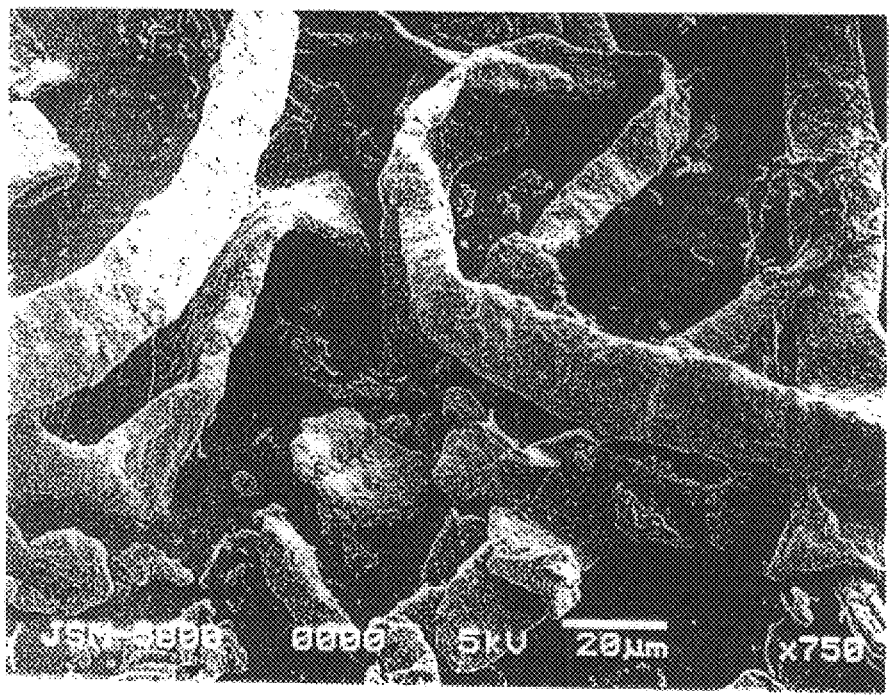
Figure 2:
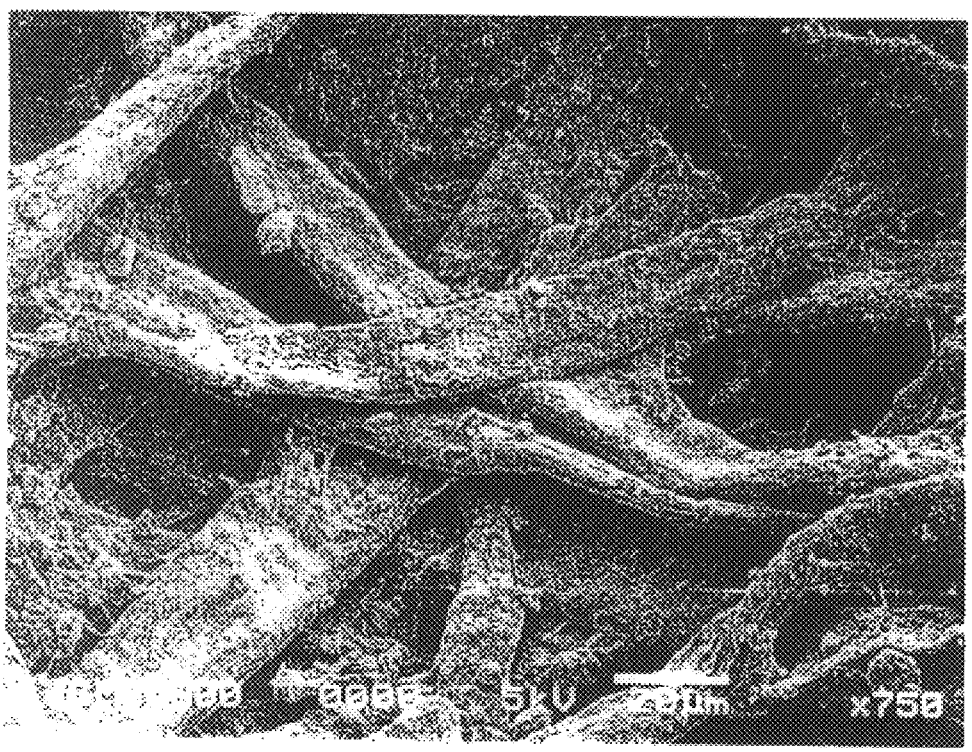
FIG. 2 is a view showing the surface and the cross section of the photocatalytic pulp composition of an embodiment of the present invention measured by a scanning microscope. (A) indicates the surface, magnification×750.

FIGS. 1 (A) and (B) and FIG. 2 show scanning microscopic photographs of the photocatalytic pulp composition and photocatalytic pulp composition (Example 2) of Example 2, respectively, it can be seen that titanium oxide is attached and connected to the external face of a pulp raw material and the state where titanium oxide is attached is maintained on the external face of a pulp and also in the interior of a paper even according to a paper making method using water. This is also clear from the fact that little titanium oxide is dissolved in water which was added at a point of stirring in a paper making experiment of Test Example.

PHOTOCATALYTIC PULP COMPOSITION: EXAMPLE (3), PHOTOCATALYTIC PULP PAPER: EXAMPLE (3)

In this Example, a ratio of blending titanium oxide, a pulp and/or a paper which forms a photocatalytic pulp composition are the same as those of the above Example (1) for preparation.

In addition, the same titanium oxide, the pulp and/or the paper as those of Preparation Example (1) can be used as a raw material.

In this Example, as in the Preparation Example (1), titanium oxide and a pulp and/or a paper are blended and at the same time 25 to 100 wt % of a thermoplastic resin is added to the total weight of the titanium oxide and pulp and/or paper to form a photocatalytic pulp composition (Photocatalytic pulp composition: Example (3)).

The photocatalytic pulp composition is formed, and a recycled paper comprising a wastepaper pulp obtained by DIP treating a wastepaper of newspaper can be laminated on the composition (Photocatalytic pulp paper: Example (3)).

As this thermoplastic resin, various resins can be used. In addition, a thermoplastic resin in the powder, particle and sheet forms can be used. Preferably, a thermoplastic resin having a particle size of 1 mm or less in the case of a powdery or particulate thermoplastic resin, or a thermoplastic resin having the thickness of 1 mm or less in the case of a sheet like thermoplastic resin is ground into pieces having the side of 10 mm or less to use it.

When the produced photocatalytic composition is heated to form a molded photocatalytic pulp, if heated at a high temperature, a pulp in this photocatalytic pulp composition is burnt by this heat in some cases and, therefore, it is preferable that a thermoplastic resin having a lower melting point such as PE (LLD; linear low density) and vinyl acetate is used as compared with a thermoplastic resin having a relatively high melting point such as polyester, polycarbon and the like.

A pulp and/or a paper and a thermoplastic resin which constitute the photocatalytic pulp are not required to place in a mixer as a separate raw material and, for example, a composite film having a paper layer laminated with a thermoplastic resin film and which is used for a milk pack is ground into small pieces having the side of around 10 mm and, thereafter, the pieces may be placed in the mixer as described above. In this case, a paper layer of the composite film becomes a pulp fiber which constitutes a photocatalytic pulp composition and a thermoplastic resin layer becomes a thermoplastic resin which constitutes the formed photocatalytic pulp composition to be formed. Therefore, an amount of titanium oxide to be blended is determined taking a ratio of a pulp component relative to a thermoplastic resin component contained in a composite film into consideration and at the same time, as necessary, a thermoplastic resin and/or a pulp and/or a paper are added so as to adjust a ratio of respective raw materials to the aforementioned ratio.

After the pulp and/or the paper and titanium oxide and the thermoplastic resin are placed in a mixer, the mixer is actuated to produce the shearing heat by the shearing force based on the stirring impact force by a stirring impact blade which rotates at a high speed in the mixer and a temperature is raised to about 120° C. to adjust the water content of the pulp and/or the paper to 3 wt %, preferably 1 wt % or less. In this step, water is evaporated from the pulp and/or the paper to dry it and, at the same time, the pulp and/or the paper in the case of a paper undergoes the grinding action by the impact force to become fibrous and, further, which is swelled accompanied with the drying, fibers are scuffed up and aggregated into a cotton-like fibrous to form three dimensionally entangled fibers. Thereafter, titanium oxide is attached to or inserted into to fix the surface of the fibers or also the interior of the fibers by the external pressing force accompanied with the stirring impact force or the shearing force by the stirring impact blade.

In addition, at the same time, at least a part of a thermoplastic resin placed into a mixer also undergoes the grinding action, and are ground into. small pieces which are attached to or inserted into to fix the surface of the fibers and the interior of the fibers by the pushing force accompanied with the stirring impact force or the shearing force by the stirring impact blade like the aforementioned titanium oxide.

When a composite film such as a milk pack is used as the aforementioned pulp and/or the paper and thermoplastic resin, small sections of the composite film placed into a mixer are separated into a thermoplastic resin layer and a paper layer by the stirring impact force by the shearing impact blade and the separated paper layer is ground by the stirring impact force and aggregated into cotton-like fibrous pulp fibers as described above for the paper.

In addition, at least a part of a thermoplastic resin layer is also ground into small pieces by the stirring impact force and attached to or inserted into to fix the surface of the pulp fibers and the interior of the pulp fibers like the aforementioned separately placed thermoplastic resin.

In addition, a thermoplastic resin is not required to melt by the heat upon stirring with a mixer as long as it is attached to or inserted into to fix the pulp fibers.

The present photocatalytic pulp composition can be easily formed into a molded photocatalytic pulp such as a press sheet and the like, for example, by pressing under heating. In addition, since the molded article which was formed by the method binds firmly between pulp fibers because a thermoplastic resin attached to or inserted in to fix the surface or the interior of the pulp fibers serves as a binder, it becomes a molded article such as a tough press sheet and the like.

A pulp composition having the photocatalytic activity obtained by the aforementioned Preparation Example was used to manufacture a molded, photocatalytic pulp composition (press sheet).

EXAMPLE AND COMPARATIVE EXAMPLE OF A PHOTOCATALYTIC PULP PAPER USING A PHOTOCATALYTIC PULP COMPOSITION

As an Example, a thermoplastic resin PE [Urdozex 4030P (powder): Mitsui Petroleum chemichal Industries Co., Ltd.] was used and the other raw materials are the same as those of the aforementioned Example 2 and the molded press sheet and a wastepaper pulp comprising a wastepaper of newspaper after a DIP step (deinking treatment) were made into a paper to dry and laminated on one side via an adhesive with hot press.

PHOTOCATALYTIC PULP PAPER; EXAMPLE 3

Paper fiber; 2 kg (80 wt %), the water content 10 wt %

Titanium oxide; 0.5 kg (20 wt %)

Thermoplastic resin: PE 1.5 kg (Paper fiber+60 wt % relative to the total weight of titanium oxide)

The water content after treatment: 0.5 wt %

The above raw material is placed into a mixer and stirred, and a temperature is raised to about 120° C. to adjust the water content of the paper fiber to 3 wt %, preferably 1 wt % or less. 0.51 g of the photocatalytic pulp composition obtained as described above was spread 8×8 cm, nipped with a Teflon sheet, and heated in a thermostatic chamber at 150° C. for 2 hours while applying a load of 1 kg to form a molded photocatalytic pulp (press sheet) having the basis weight of 50 g/m$^2$, the molded press sheet and a wastepaper pulp comprising a wastepaper of newspaper after a DIP step (deinking treatment) were made into a paper to dry. The basis weight 10 g/m$^2$ was laminated on one side via an adhesive with hot press which was used as a sample (Example 3).

Beater treatment time 1 hour

Concentration of photocatalytic pulp 8 wt %

A photocatalytic pulp was not treated with a beater.

Basis weight Total 60 g/m$^2$

Photocatalytic pulp layer 50 g/m$^2$

Newspaper wastepaper pulp layer 10 g/m$^2$

COMPARATIVE EXAMPLE 2 (The AFOREMENTIONED PHOTOCATALYTIC PULP PAPER; EXAMPLE 2)

Crushed Paper fiber; 2 kg (80 wt %), the water content 10 wt %

Titanium oxide; 0.5 kg (20 wt %)

The water content after treatment; 0.6 wt %

The photocatalytic pulp composition obtained in the aforementioned Example (2) was used and made into a paper according to the same step of the Comparative Example 1 (basis weight, total 50 g/m$^2$), a wastepaper pulp comprising a wastepaper of newspaper after a DIP step (deinking step) and this molded photocatalytic pulp were made into a paper to dry (basis weight, total 10 g/m$^2$), which was laminated one side via an adhesive with a hot press.

Beater treatment time 1 hour

Concentration of photocatalytic pulp 8 wt %

Concentration of wastepaper of newspaper 8 wt %

Basis weight Total 60 g/m$^2$

Photocatalytic pulp layer 50 g/m$^2$

Newspaper wastepaper pulp layer 10 g/m$^2$

The results comparing the molded photocatalytic pulp of the aforementioned Example 3 and Comparative Example 2 under the following conditions are shown in Table 2.
Experimental Conditions Concentration of added acetaldehyde about 820 ppm Light intensity about 1 mmW/cm$^2$ Reaction vessel 1 liter Photocatalytic Pulp Paper and other Comparative Example Sample size: 8×8 cm Basis weight Total 60 g/m$^2$

TABLE 2

| | Photocatalyst $CO_2$ initial producing rate ppm/min | $CO_2$ production rate at 1 h (%) | $CO_2$ production rate at 2 h (%) | Acetaldehyde initial vanishing rate (ppm/min.) | $CO_2$ 100% production time time (h) |
|---|---|---|---|---|---|
| Test Ex. 3 | 24.3 | 70 | 100 | 16.2 | 2 |
| Com. Ex. 2 | 24.0 | 68 | 100 | 17.5 | 2 |

It was confirmed that the molded photocatalytic pulp (press sheet+wastepaper; Example 3) formed from the photocatalytic pulp composition manufactured in Example 3 has approximately the same properties as those of the photocatalytic pulp paper

COMPARATIVE EXAMPLE 2

Therefore, it was revealed that the molded photocatalytic pulp of the aforementioned Example 3 has the effect of improving the photocatalytic activity efficiency which can not be obtained by simply mixing titanium oxide.

In addition, since $CO_2$ production rate at 2 hours is 100%, the sufficient reaction occurs even after the concentration of acetaldehyde is decreased.

The aforementioned regenerated paper, having the photocatalytic activity function, in which waste papers are laminated, can be laminated into a two-layered or a three-layered laminate with a normal paper, a synthetic paper, a plastic film or a non-woven fabric by using as a laminating material such as a wastepaper pulp core material, a substrate or the like, with a paper on the photocatalytic side as an inner, outer or intermediate layer. In this case, by using a material having the excellent light transmissibility such as a normal paper, a synthetic paper, a non-woven fabric, a woven fabric, a non-woven fabric having the low fiber density, a woven fabric having the crude weave pattern, a transparent film and the like having the light transmissibility or having many openings as a core material or a substrate, in the case where a photocatalytic pulp is positioned on the light source side and is arranged so as to be exposed directly, as well as also in the case where the photocatalytic pulp is not positioned on the light source side such as in the case where the photocatalytic pulp is held between core materials or substrates and the like, the photocatalytic pulp is irradiated with the light having passed through a core material or a substrate and, whereby, the photocatalytic property of titanium oxide is suitably exerted and, at the same time, by providing a core material or a substrate with openings or the like having the air permeability, the molded photocatalytic pulp becomes easy to use as a filter or the like.

EXAMPLE 1 OF A PAPER STRING AS A MOLDED ARTICLE COMPRISING THE LAMINATED PHOTOCATALYTIC PULP PAPER

A cow's milk pack was treated in the same splitting and disaggregating step as that of Example 1 to obtain a pulp. To this was fixed about 23 wt % of titanium oxide in the aforementioned fixing-treatment step to obtain a photocatalytic pulp composition. Then, the resulting photocatalytic pulp composition was diluted to the pulp concentration of 8 wt % and beat-treated with a beater for 1 hour.

On the other hand, 43 g/m$^2$ of a pulp obtained by treating the same cow's milk pack as described above was diluted with water to the pulp concentration of 8 wt %, beat-treated for 1 hour and, then, a photocatalytic layer (20 g/m$^2$) into which 15 wt % of a photocatalytic pulp had been blended and a pulp layer (43 g/m$^2$) comprising a cow's milk pack were made into a paper with a wire paper machine or a cylinder paper machine, respectively, using a paper machine for making a paper in the known paper making step, and they were stacked, transferred to a press part, further dried and made into a paper to obtain 63 g/m$^2$ of a two-layered photocatalytic pulp paper.

Experiment 1 in the following Table shows the evaluation of physical properties of the aforementioned photocatalytic pulp paper.

After a sample was allowed to stand in a chamber at a constant temperature and a constant humidity for 24 hours, measurement was performed according to JIS P8124, JIS P8113 and JIS P8135.

This photocatalytic pulp paper was cut into a width of 48 mm with a slitter, and wound into an about 500 m roll, which was twisted by the known ring twister so that the aforementioned photocatalytic pulp layer becomes an outer surface to obtain an about 3 mm φ paper string.

Experiment 2 in the following Table shows the evaluation of physical properties of a paper string comprising the aforementioned photocatalytic pulp paper.

After the paper string was subjected to moisture conditioning at a temperature of 20±5° C. and a relative humidity of 65+2% for 48 hours or longer so that it dose not become dry, measurement was performed according to JIS Z1518–1976.

TABLE 3

Experiments 1 and 2

| | | Ex. 1 | Ex. 2 |
|---|---|---|---|
| Experiment 1 | Basis weight (g/m$^2$) | 63 | 38 |
| | Tensile strength (longitudinal) (Kg/15 mm) | 4.2 | 3.8 |
| | Tensile strength (transverse) (Kg/15 mm) | 2.06 | 0.78 |
| | Wet tensile strength (longitudinal)(Kg/15 mm) | 1.6 | 0.38 |
| | Wet tensile strength (transverse)(Kg/15 mm) | 1.13 | 0.18 |
| Experiment 2 | Width (mm) | 48 | 20 |
| | Size (mm) | 3 | 1 |
| | Weight (g/10 m) | 30.2 | 7.6 |

EXAMPLE 2 OF A PAPER STRING COMPRISING THE AFOREMENTIONED LAMINATED PHOTOCATALYTIC PULP PAPER

According to the same manner as that of Example 1, there was obtained 38 g/m$^2$ of two-layered photocatalytic pulp, which was made into a paper, comprising a pulp layer (26 g/m$^2$) obtained by treating a photocatalytic layer (12/m$^2$), to which about 15% of a photocatalytic pulp composition: titanium oxide 23 wt % fixation had been added, with a cow's milk pack. Then, the two-layered photocatalytic pulp was twisted so that the aforementioned photocatalytic pulp layer became an outer surface, to obtain an about 1 mm φ paper string.

EXAMPLE 3 OF A LONG AND NARROW STRING AS A MOLDED ARTICLE COMPRISING THE AFOREMENTIONED LAMINATED PHOTOCATALYTIC PULP PAPER STRING 16 paper strings prepared in Example 2 of a paper string were stacked on the same plane, and immersed in the varying concentrations (1 st time: 30 wt %, 2nd time: 15 wt %: 3rd time: 3 wt % aqueous solution) of water-soluble poly vinyl alcohol as a water-soluble adhesive and dried (immersion and drying were repeated three times) to obtain a long and narrow string having a width of 20 mm. Then, at least one surface of the long and narrow string was subjected to sanding (manufactured by Amitecs; NS-15D; sandpaper #400) to expose a photocatalytic layer.

Experiment 3 in the following Table 5 used, as a sample, the paper strings of Examples 1 and 2, the long and narrow strings of Example 3 before and after sanding, and a long and narrow string containing no photocatalyst of Comparative Example 1.

Experimental Conditions

Gas/concentration: added acetaldehyde gas/20 ppm (concentration after absorbed onto a paper)

Irradiation intensity About 1 mW/cm$^2$

Reaction vessel 3 liter

Sample: Cut to a total area of 5 cm,/10 cm

Light source: 40W Black light

Measurement: Measured with Gastec detecting tube 92L

Pretreatment: Dried for 1 day in a desiccator after irradiated with 1 mW/cm$^2$ ultra violet-ray for 15 hours.

TABLE 4

Concentration of acetaldehyde gas (ppm)

| Irradiation time | Example 1 | Example 2 | Example 3 Before sanding | Example 3 After sanding | Comparative Example 1 |
|---|---|---|---|---|---|
| 0 min | 18 | 18 | 19 | 18 | 19 |
| 20 min | 6 | 4 | 16 | 5 | 18 |
| 60 min | 0 | 0 | 15 | 0 | 17 |

A photocatalytic pulp paper including a wastepaper laminated photocatalytic recycling paper having the antibacterial, antimold, stainproofing and bad smell degrading, deodorizing and harmful material oxidatively degrading effects, and which is widely used for a packing material, a building material, a filtering material and the like, a paper string comprising the laminated photocatalytic pulp paper and a molded article comprising the paper string which can quicken the reacting rate and the completion of the reaction remarkably and improve a photocatalytic property of titanium oxide can be provided.

Now, that the invention has been described. Thus, the broadest claims that follow are not directed to a machine that is configure in a specific way. Instead, said broadest claims are intended to protect the heart or essence of this breakthrough invention.

This invention is clearly new and useful. Moreover, it was not obvious to those of ordinary skill in the art at the time it was made, in view of the prior art when considered as a whole.

Moreover, in view of the revolutionary nature of this invention, it is clearly a pioneering invention. As such, the claims that follow are entitled to very broad interpretation so as to protect the heart of this invention, as a matter of law.

It will thus be seen that the objects set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A laminated photocatalytic pulp comprising a virgin pulp or a wastepaper pulp laminated on a photocatalytic pulp composition, said photocatalytic pulp composition comprising a mixture of 40–95 wt % of a pulp and/or a paper having a water content of 3 wt % or less, an average fiber diameter of 5–300 µm and an average fiber length of 0.1–70 mm, and 5–60 wt % of titanium oxide dispersed in the pulp and/or paper fibers.

2. A laminated photocatalytic pulp paper according to claim 1, wherein the photocatalytic pulp composition further comprises 25–100 wt % relative to a total weight of the titanium oxide, the pulp and/or the paper of a thermoplastic resin are blended.

3. The laminated photocatalytic pulp paper according to claim 1, comprising a newspaper wastepaper.

4. The laminated photocatalytic pulp paper according to claim 1, wherein comprising a newspaper wastepaper in the form of a core material or a substrate and the photocatalytic pulp composition is laminated on said newspaper wastepaper pulp as a core material or a substrate.

5. The laminated photocatalytic pulp paper according to claim 1, wherein a synthetic fiber having an average fiber length of 1–100 mm, an average diameter of 10–40 µm and a melting point of 120° C. or higher is blended with 5–60 wt % of titanium oxide and 40–95 wt % of a pulp and/or a paper, at a maximum ratio of 1:9.

6. A paper string which comprises a twisted laminated photocatalytic pulp paper, wherein said laminated photocatalytic pulp paper is obtained by laminating a virgin pulp or a wastepaper pulp on a photocatalytic pulp composition and the resulting laminate is cutted to an arbitrary width, said photocatalytic pulp paper composition comprising a mixture of; 40–95 wt % of a pulp and/or a paper having the water content of 3 wt % or less, an average fiber diameter of 5–300 µm and an average fiber length of 0.1–70 mm and 5–60 wt % of titanium oxide, dispersed in the pulp fibers.

7. A process for preparing the paper string comprising a photocatalytic paper as defined in claim 6, which comprises cutting the aforementioned laminated photocatalytic pulp paper to a width of 5–50 mm, winding the cut paper in a roll-manner, and twisting, the roll.

8. A molded article comprising the paper string as define in claim 6, which comprises a flat string, wherein said flat string is obtained by stacking a plurality of paper strings on the same plane.

9. A molded article comprising a woven fabric comprising the paper string as defined in claim 6 as a weft and a natural or chemical fiber as a warp.

10. A molded article comprising the paper string as defined in claim 6.

11. A process for producing a laminated photocatalytic pulp paper, which comprises a step of imparting the stirring impact force to a blend obtained by blending 40–95 wt % of a pulp and/or a paper which has been split and disaggregated to an average fiber diameter of 5–300 µm and an average fiber length of 0.1–70 mm with 5–60 wt % of titanium oxide to stir and, whereby, the shear exothermic heat is generated by a shearing force based on the stirring impact force and the blend is dried by this shear exothermic heat to reduce the water content to 3 wt % or less, a step of swelling the pulp and/or the paper upon the drying to obtain a three-dimensionally entangled material, a treatment step of pushing the titanium oxide against the fiber surface of the pulp and/or the paper by the stirring impact force to fix thereto, and a step of laminating a virgin pulp or a wastepaper pulp after the treatment step of pushing and fixing the titanium oxide.

12. The process for preparing a laminated photocatalytic pulp paper according to claim 11 wherein a virgin pulp or a wastepaper pulp is paper making-laminated in a paper making step after the treatment step of pushing and fixing the titanium oxide.

13. A process for preparing a laminated photocatalytic pulp paper according to claim 11, wherein the pulp is a paperboard-like dry pulp.

14. The process for preparing a laminated photocatalytic pulp paper according to claim 11, wherein the wastepaper pulp comprises a newspaper wastepaper and lamination is performed using the wastepaper pulp as a core material or a substrate.

15. The process for preparing a laminated photocatalytic pulp paper according to claim 11, wherein a synthetic fiber having an average fiber length of 1–100 mm, an average diameter of 10–40 µm and a melting point of 120° C. or higher is blended with 5–60 wt % of titanium oxide and 40–95 wt % of a pulp and/or a paper, at a maximum ratio of 1:9.

16. A process for producing a laminated photocatalytic pulp paper, which comprises a step of imparting the stirring impact force to a blend in which 5–60 wt % of titanium oxide, 40–95 wt % of a pulp and/or a paper having the water content of 3 wt % or less, an average fiber diameter of 5–300 μmn and an average fiber length of 0.1–70 mm, and 25–100 wt % relative to a total weight of the titanium oxide, the pulp and/or the paper of a thermoplastic resin are blended and, whereby, the shear exothermic heat is generated by a shearing force based on the stirring impact force and the blend is dried by this shear exothermic heat to reduce the water content to 3 wt % or less, a step of swelling the pulp and/or the paper upon the drying to obtain a three-dimensionally entangled material, a treatment step of pushing the titanium oxide and the thermoplastic resin against the fiber surface of the pulp and/or the paper by the stirring impact force to fix thereto, a step of pushing titanium oxide against the fiber surface of the pulp and/or the paper to fix thereto, and a step of laminating a virgin pulp or a wastepaper pulp after the treatment step of pushing and fixing the titanium oxide.

\* \* \* \* \*

UNITED STATES PATENT AND TRADEMARK OFFICE
CERTIFICATE OF CORRECTION

PATENT NO. : 6,673,207 B1 Page 1 of 1
DATED : January 6, 2004
INVENTOR(S) : Sadao Nishibori It is certified that error appears in the above-identified patent and that said Letters Patent is hereby corrected as shown below:

Column 17,
Line 6, "$\mu$mn" should be -- $\mu$m --.

Signed and Sealed this

Twenty-second Day of March, 2005

JON W. DUDAS
*Director of the United States Patent and Trademark Office*